United States Patent [19]

Onuki et al.

[11] Patent Number: 5,508,517

[45] Date of Patent: Apr. 16, 1996

[54] SCANNING PROBE TYPE MICROSCOPE APPARATUS

[75] Inventors: Tetsuji Onuki; Masatoshi Suzuki; Toru Fujii, all of Kanagawa; Hiroyuki Matsushiro, Tokyo; Hideaki Ohkubo, Kanagawa, all of Japan

[73] Assignee: Nikon Corporation, Tokyo, Japan

[21] Appl. No.: 461,142

[22] Filed: Jun. 5, 1995

Related U.S. Application Data

[63] Continuation of Ser. No. 325,535, Oct. 18, 1994, abandoned, which is a continuation of Ser. No. 136,500, Oct. 14, 1993, abandoned, which is a continuation of Ser. No. 12,968, Jan. 29, 1993, abandoned, which is a continuation of Ser. No. 849,942, Mar. 12, 1992, abandoned.

[30] Foreign Application Priority Data

Mar. 15, 1991 [JP] Japan .................. 3-074288

[51] Int. Cl.[6] .................................................. H01J 37/26
[52] U.S. Cl. .................................................. 250/306
[58] Field of Search .................. 250/306, 307; 359/368

[56] References Cited

U.S. PATENT DOCUMENTS

| | | | |
|---|---|---|---|
| 4,914,293 | 4/1990 | Hayashi et al. | 250/306 |
| 4,935,634 | 6/1990 | Hansma et al. | 250/306 |
| 4,999,495 | 3/1991 | Miyata et al. | 250/306 |
| 5,025,658 | 6/1991 | Elings et al. | 73/105 |
| 5,041,783 | 8/1991 | Ohta et al. | 250/306 |
| 5,083,022 | 1/1992 | Miyamoto et al. | 250/306 |
| 5,276,324 | 1/1994 | Ohtaki et al. | 250/306 |
| 5,317,153 | 5/1994 | Matsushiro et al. | 250/306 |
| 5,360,977 | 11/1994 | Onuki et al. | 250/306 |

FOREIGN PATENT DOCUMENTS

| | | |
|---|---|---|
| 0394962 | 4/1990 | European Pat. Off. . |
| 0405973 | 6/1990 | European Pat. Off. . |
| 0296871 | 6/1990 | European Pat. Off. . |
| 2163602 | 6/1990 | Japan . |
| 2163601 | 6/1990 | Japan . |
| 216403 | 7/1990 | Japan . |

OTHER PUBLICATIONS

Sato et al. "Scanning type tunnel microscope", WO 89/01603.

IBM Techinical Disclosure Bulletin, vol. 1, No. 30, Oct. 1987, New York, U.S.A., pp. 369–370; "Optically transparent tip for tunneling microscopy".

Journal Of Vacuum Science And Technology: Part A, vol. 8, No. 1, Jan. 1990, New York, U.S.A., pp. 350–353; M. Yasutake et al. "Scanning tunneling Microscope combined with optical microscope for large sample measurement".

Applied Optics, vol. 29, No. 26, Sep. 10, 1990, New York, U.S.A, pp. 3769–3774; T. R. Corle et al. "Differential interference contrast imaging on a real time confocal scanning optical microscope".

Primary Examiner—Jack I. Berman
Assistant Examiner—Kiet T. Nguyen
Attorney, Agent, or Firm—Michael N. Meller

[57] ABSTRACT

A high resolution scanning probe type microscope capable for simultaneous observation of the optical images of a sample and the probe tip. The microscope has a construction in which the probe and the optical microscope are supported with separate supporting members and the probe is disposed inside the visual field of the optical microscope. The supporting members of the probe and the optical microscope are installed on a vibration-proof table, and the supporting member for the probe has a double-end-supported type beam construction.

13 Claims, 5 Drawing Sheets

SCANNING PROBE TYPE MICROSCOPE APPARATUS

This application is a continuation of application Ser. No. 08/325,535, filed Oct. 18, 1994, now abandoned which is a continuation of application Ser. No. 08/136,500, filed Oct. 14, 1993, now abandoned which is a continuation of application Ser. No. 08/012968, filed Jan. 29, 1993, now abandoned which is a continuation of Ser. No. 08/849942 filed Mar. 12, 1992 now abandoned.

BACKGROUND OF THE INVENTION

1. Field of the Invention

The present invention relates to a scanning probe type microscope apparatus which is capable of simultaneously observing an optical microscopic image of a scanning probe tip and that of a sample surface.

2. Description of the Prior Art

In recent years, many efforts have been made for the development and the improvement of a scanning probe type microscope apparatus in which the sample surface is scanned in close vicinity to it with a probe and its microstructure is observed by means of detecting a tunnel current, an atomic force or a magnetic force acting between the probe and the sample.

Figure 5:
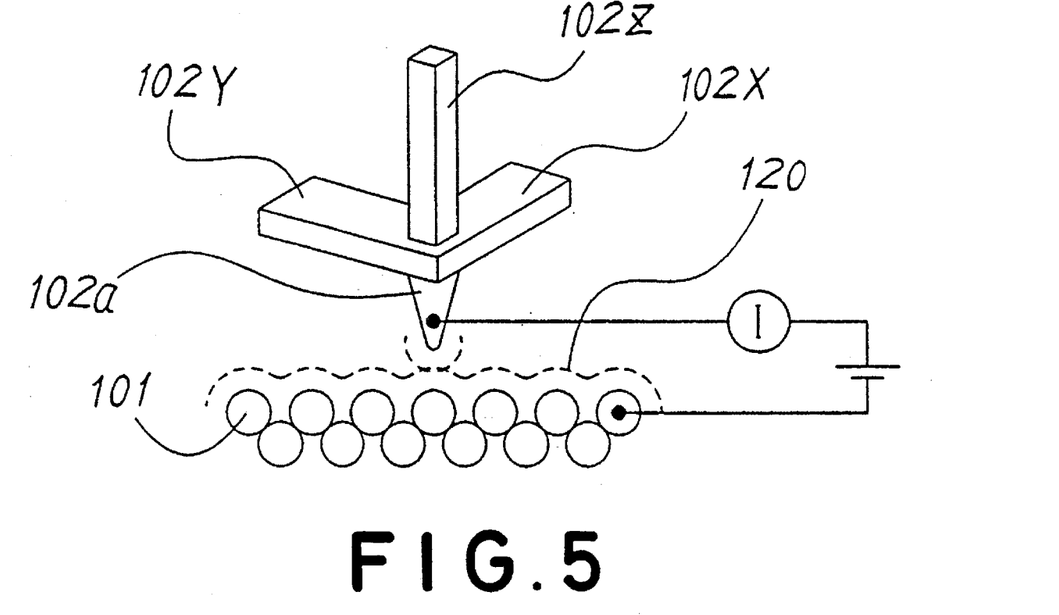
FIG. 5 is a conceptional representation for explaining the principle of a scanning tunnel microscope.

FIG. 5 shows a conceptional representation for explaining the principle of a scanning tunnel microscope (STM), a kind of scanning probe type microscopes. As shown in the figure, a bias voltage is given to either of a conductive sample 101 or a scanning probe 102a, and when they are made to be close to each other in the order of 1 to 2 nm, the electron clouds 120 on both sides are overlapped and a tunnel effect in which electrons pass through the gap between the tip of the scanning probe 102a and the sample 101 is generated and thus a tunnel current flows. Therefore, the value of the current which flows between the scanning probe 102a and the sample 101 can be varied by moving the scanning probe 102a in vertical direction by means of a piezoelectric element 102Z in the direction of Z axis. A three dimensional image of the sample surface can be obtained at a resolution of an atomic level by making a raster scan on the sample surface with piezoelectric elements 102X and 102Y in the directions of X axis and Y axis respectively in keeping the current at a constant value with a feedback circuit (in moving the scanning probe 102a in vertical direction to keep the gap between the scanning probe 102a and the sample 101 constant).

Figure 6:
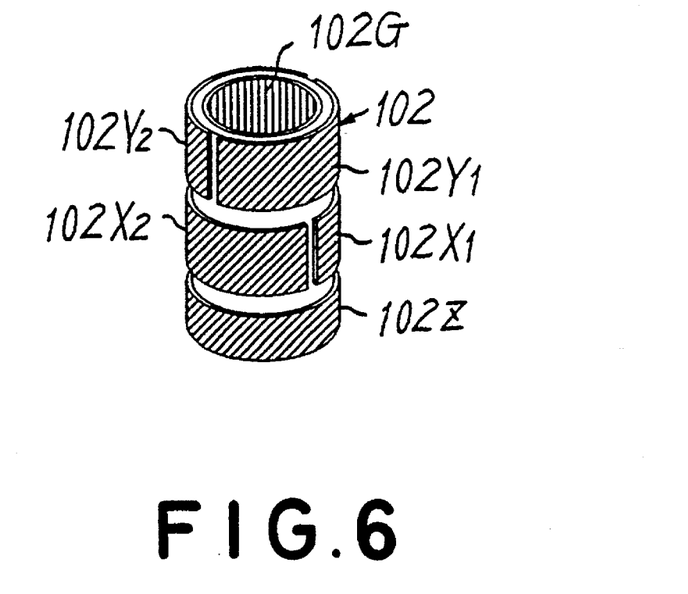
FIG. 6 is a typical perspective view of a tube type probe.

In FIG. 5, the scanning probe 102a so-called a tripod type is shown for easy understanding of the explanation, a probe which is generally used is, however, a tube type probe as shown in FIG. 6. In the case of the probe shown in FIG. 6, an electrode 102G is deposited on the inner peripheral surface of a piezoelectric ceramic member of a cylindrical shape, and on the outer peripheral surface of it, X-direction electrodes 102X1 and 102X2, Y-direction electrodes 102Y1 and 102Y2 and a Z-direction electrode 102Z are deposited. The movement of the probe tip (not shown in the drawing) in three dimensional directions is made possible by selectively applying a voltage to each of the electrodes.

Figure 7:
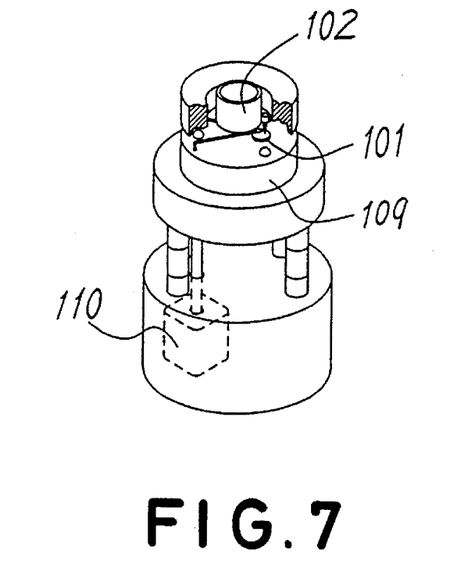
FIG. 7 is a perspective view showing an example of a conventional scanning tunnel microscope.

FIG. 7 is a perspective view showing an example of a conventional scanning tunnel microscope using a tube type probe. In the figure, a probe 102 with a probe tip is disposed opposing to a sample holder 109 loaded with a sample 101. The sample holder 109 is moved with a stepping motor 110 and is made to be close enough to the scanning probe 102 till a tunnel current is detected, and an optimum tunnel current is decided according to the current to be detected from the scanning probe 102. A three dimensional image of the surface of the sample 101 can be obtained by scanning the surface of the sample 101 in vertocal moving the probe 102 to maintain the current at a preset value.

In a conventional scanning probe type microscope as described above, however, it is impossible to observe the roughness on a surface of a sample at a resolution of an optical microscope level, so that the following problems are considered to be solved. That is, although the abovementioned scanning tunnel microscope has a high resolution on the one hand, the maximum observing area of the microscope is as narrow as about 10 mm square, so that it is difficult to specify an observing spot, and therefore, such a case may occur as that the tip of the scanning probe hits against a sharp roughness portion on the surface resulting the destroy of the tip, or that a measurement is made without confirming if the sample surface is contaminated.

In a case where a pattern formed on the surface of a substrate, such as a semiconductor wafer for example, is to be observed, although an alignment operation is required to set an observing spot onto a specified position, it is almost impossible to make a precise alignment with only a scanning tunnel microscope which has a narrow observation area.

In order to solve such problems, some proposals have been made as follows.

That is, in one of the proposals, an objective lens of an optical microscope and a tube type scanning probe of a scanning tunnel microscope are mounted on a revolver of the optical microscope, and the observation by the optical microscope and the observation by the scanning tunnel microscope are respectively made by turning the revolver.

In U.S. Pat. No. 4,999,495 granted to Miyata et al., it is disclosed that, for the purpose of solving the problem in the case of mounting both the objective lens and the probe onto the same revolver (such as a difficult wiring for the prove), the objective lens and the probe of the scanning tunnel microscope are supported on a single-axis table so as to face either of the objective lens or the probe to a sample to be observed by moving the single-axis table, or the scanning probe is supported by a frame of the optical microscope so as to make a positioning by an optical microscope and then a sample stage is moved by a specified correction quantity for the alignment of the probe and the sample on the stage.

Further, according to teachings disclosed in U.S. Pat. No. 4,914,293 granted to Hayashi et al., the probe of the scanning tunnel microscope is integrally mounted to the object lens of the optical microscope, or the probe of the scanning tunnel microscope is mounted on a transparent member attached on the lower end of the objective lens, thereby combining the scanning tunnel microscope and the optical microscope.

In the construction proposed in the U.S. Pat. No. 4,999,495, however, the probe is disposed in a position apart from the optical axis of the optical microscope, so that there is a problem that the surface of the sample and the tip of the probe cannot be observed simultaneously.

In the cases of conventional proposals, every one of them has a construction in which the scanning probe is supported on a constituent of the optical microscope, such as an arm or the object lens, on the one hand, the conventional optical microscope has a cantilever structure from the arm to the revolver which holds the object lens. Also a heavy arm of the optical microscope and a mechanism for moving the object lens in vertical direction are weak for vibration, so that it has a low frequency vibration mode in which the resonant frequency lies close to the scanning frequency of the probe tip. Therefore, in the combined construction of the optical microscope and the scanning probe type microscope, if the probe of the scanning probe type microscope is simply fixed to the arm or the optical member of the optical microscope as in the case of the conventional construction, the vibration on the optical microscope is transmitted to the scanning probe, thereby making it difficult to obtain a resolution of an atomic level which is to be a naturally expected level for the scanning probe type microscope. In order to obtain the resolution of the atomic level in the scanning probe type microscope, the noise characteristics caused by the vibration shall be flat over the frequency range of 1 kHz to several tens of kHz and its amplitude shall be within the order of 0.1 angstrom, but it has been impossible to realize such circumstances in any apparatus ever proposed.

SUMMARY OF THE INVENTION

In consideration of the above-mentioned problems, it is an object of the present invention to provide a scanning probe type microscope in which the optical images of a sample surface and a scanning probe tip can be simultaneously observed, and the sample surface can be scanned at a high resolution without being influenced by vibration.

According to one aspect of the present invention, a scanning probe type microscope apparatus comprises a probe for scanning a sample surface, an optical microscope for observing the probe and the sample surface and separate supporting means including a first supporting member for supporting said optical microscope and a second supporting member for supporting said probe so as to dispose said probe inside the visual field of said optical microscope.

In a preferred embodiment to dispose the probe inside the visual field of the optical microscope, an objective lens of said optical microscope is provided with a through hole in which said probe is installed.

In order to effectively decrease the vibration of the probe or the influence of external circumstances, it is preferable that the second supporting member for the probe is formed as a double-end-supported structure and each of the probe and an electric system for operating the scanning probe type microscope is covered with a soundproof and electromagnetic shielding member respectively.

As described in the above, in the scanning probe type microscope apparatus according to the present invention, the scanning probe is disposed inside the visual field of the optical microscope and they are supported with separate supporting means, so that the simultaneous observation of the sample surface and the probe is made possible and also it is made possible to avoid the influence of vibration of the optical microscope, thereby obtaining a high resolution power for the scanning probe type microscope.

Further, owing to a double-end-supported structure of the second supporting member for the probe, the resonant frequency of the supporting system becomes higher than that of the conventional cantilever structure, and the resonant oscillations in a low frequency band of respective constituents of the scanning probe type microscope can be avoided more certainly.

Now, the resonant frequency of a cantilever is described as below:

$\omega \propto \{(k/m)\}^{1/2}$ where k is a spring constant and m is a mass, and $k=3EJ/L^3$ where J is a geometrical moment of inertia, E is Young's modulus and L is an arm length.

When the supporting member has a double-end-supported structure and the scanning probe is positioned at the median point of the supporting member as shown in an embodiment (FIG. 1) to be described later, the spring constant k becomes $k=192 EJ/L^3$ so that the resonant frequency is remarkably raised in comparison with the case of the cantilever structure, and the resonant oscillation in a low frequency band of the scanning probe can be certainly avoided.

According to the scanning probe type microscope apparatus of the present invention as constructed in this manner, the influence of the vibration of the optical microscope can be avoided, the resolution power of an atomic level can be obtained and the optical images of the sample surface and the probe can be simultaneously observed. In other words, the probe can be easily positioned at a specified spot on the sample surface, the probe can be prevented from the damages caused by a sharp unevenness on the sample surface, and the atomic-level fine structure of the sample surface can be observed.

In addition, according to the present invention, there is an advantage that the freedom in designing the way of supporting the probe can be increased since the supporting members for the probe and the optical microscope are individually provided and the supporting member for the probe can be designed only for supporting the probe.

Other and further objects, feature and advantages of the present invention will appear more fully from the following description with reference to the accompanying drawings.

DESCRIPTION OF THE PREFERRED EMBODIMENTS

Figure 1:
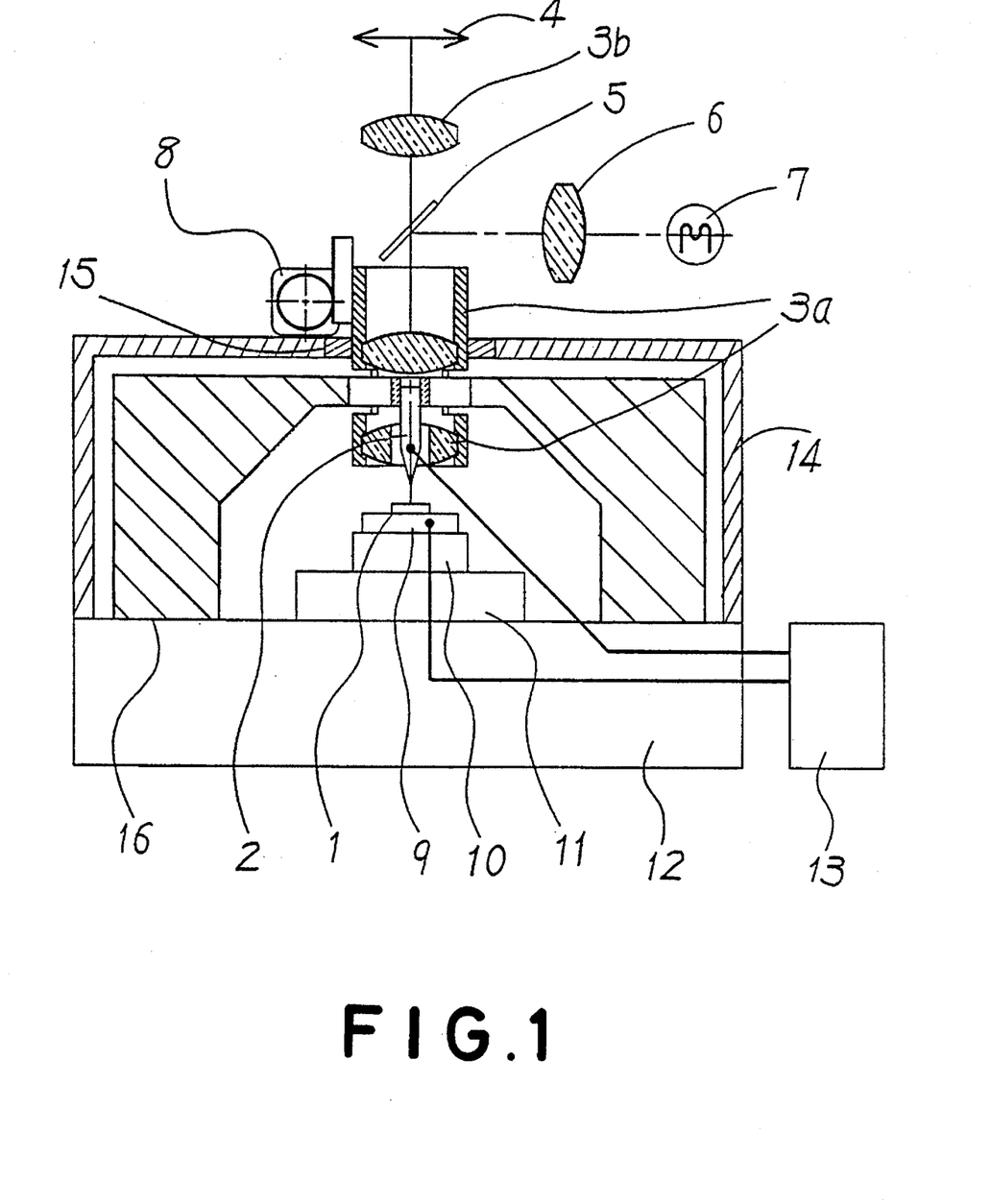
FIG. 1 is a typical sectional view of a scanning probe type microscope apparatus according to an embodiment of the present invention.
Figure 2:
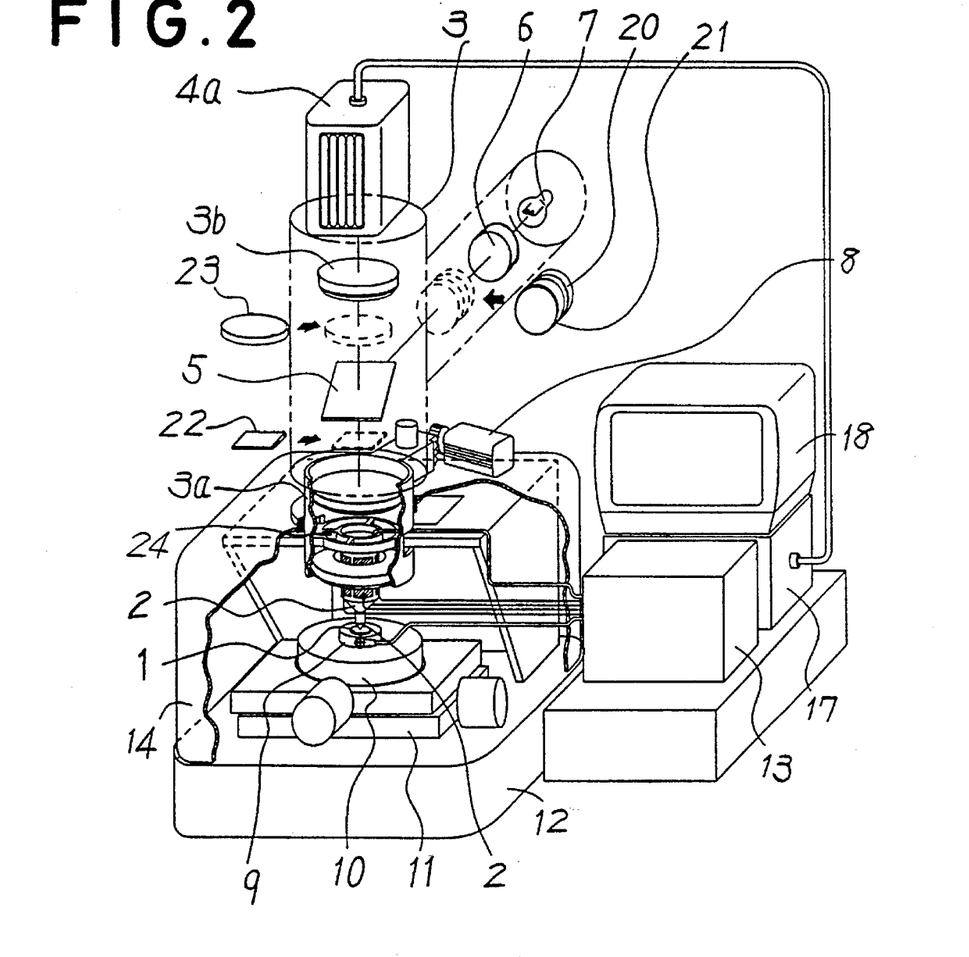
FIG. 2 is a perspective view showing the constitution of a scanning probe type microscope apparatus according to an embodiment of the present invention.

FIG. 1 shows a typical sectional view for explaining the supporting construction of an apparatus according to the first embodiment, and FIG. 2 is a perspective view showing the general construction of the apparatus.

In FIG. 1, a sample 1 is placed on a sample holder 9 disposed onto a vibration-proof table which is provided with an XY stage 11 and a Z stage 10 for a rough movement, and a probe 2 of a scanning tunnel microscope is supported to face the sample 1 by means of a column 16 having excellent mechanical strength and a high resonant frequency. The column 16 is, as shown in the figure, formed into a hollow body shape having a symmetrical crosssection about a center axis, and is disposed on the vibration prooftable 12 so as to cover the sample holder 9 therein and to support the probe 2 at the median point of its double-end-supported beam structure. The portion supporting the probe 2 is constituted with a hollow chuck member 24 (refer to FIG. 2).

The probe 2 and the sample holder 9 are respectively connected with a transmitter/receiver circuit 13 for a plurality of piezoelectric elements mounted on the probe 2, and a tunnel current is made to flow between the sample 1 and the probe 2 by a bias voltage applied to the sample holder 9 from the circuit 13.

Figure 3:
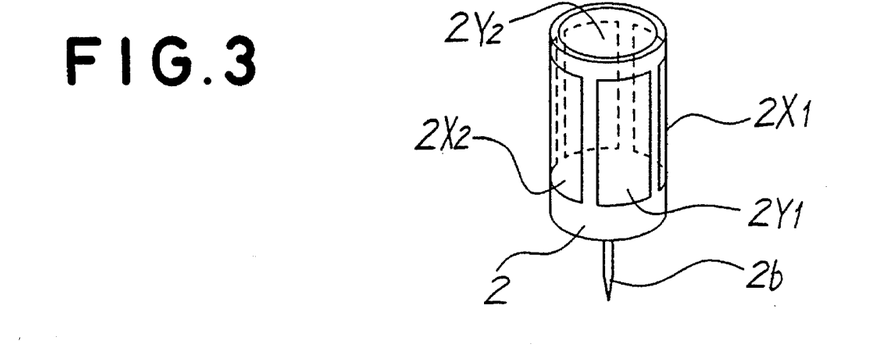
FIG. 3 is a perspective view of a probe used in the apparatus shown in FIG. 1.

The probe 2 in the present embodiment is of a tube scanner type as shown in FIG. 3 and constructed in such a manner that electrodes $2X_1$ and $2X_2$ for the piezoelectric element for x-direction scanning and electrodes $2Y_1$ and $2Y_2$ for the piezoelectric element for y-direction scanning are deposited on the outer peripheral surface of a cylindrical piezoelectric ceramics at predetermined positions where the electrodes for x-direction face each other and the electrodes for y-direction face each other. When the raster scanning is to be performed in x and y directions, drive voltages are applied to the electrodes for respective directions, and the vertical motion of the probe 2 in z direction is performed if the piezoelectric elements for both directions, x and y directions, are used and either positive or negative voltage is applied to the electrodes facing each other, in both x and y directions.

A cover 14 having the effects of soundproofing and electromagnetic shielding is disposed outside the column 16 which supports the scanning probe 2. A first objective lens 3a of the optical microscope is inserted into an opening provided approximately at the central part of the upper surface of the cover 14 (a spot corresponding to the supporting position of the scanning probe 2 by the column 16), and the optical microscope (light source 7, condenser lens 6, first objective lens 3a and second object lens 3b) is supported by the cover 14. A soft cushion member 15 is disposed in a gap between the first objective lens 3a and the cover 14 to prevent a friction force which occurs when the first objective lens 3a is moved in vertical direction by a motor 8. The member 15 also plays the role of soundproofing. As shown in FIG. 1, the cover 14 supporting the optical microscope is placed on the vibration-proof table 12 for suppressing the transmission of the vibration from the optical microscope to the scanning tunnel microscope. Further, the influence of external sound noise or electromagnetic noise is also cut off by the cover 14.

The first object lens 3a inserted into the cover 14 is provided with a hole, and the scanning probe 2 is disposed in a space inside the hole. Owing to the construction in this manner, the probe 2 can be disposed inside the visual field of the optical microscope (on the optical axis, in the case of the present embodiment) in an isolated state from the optical microscope.

It will be needless to say that if the total length of the probe 2 is shorter than the distance between the objective lens 3a and the sample 1 under the condition where the object lens 3a is positioned at the lowest position, the probe 2 can be disposed between the lower end of the objective lens 3a and the sample holder 9 without making the through hole in the object lens 3a. Also in this case, the probe 2 may be supported with a supporting member isolated from the optical microscope.

The illumination light from the light source 7 of the optical microscope is converged by the condenser lens 6 and reflected at the half-mirror 5 to illuminate the surface of the sample 1 and the tip of the probe 2 via the first objective lens 3a. The reflected diffraction light from the sample 1 and the probe 2 again passes through the first object lens 3a, transmits the half-mirror 5, and is imaged on a imaging surface 4 by the second object lens 3b. Thus the optical image of the surface of the sample 1 and that of the tip of the probe 2 can be simultaneously observed.

Next, the operation of the scanning probe type microscope apparatus according to the present embodiment will be explained referring to FIG. 2. At first, the sample 1 is placed on the sample holder 9, and the optical images of the tip of the probe 2 and the sample 1 are observed under the condition where they are close to each other. In this case, if the probe 2 is to be exchanged, since there can be differences in lengths of the probes, the z stage 10 for rough movement is adapted to be able to set down to the lowest position.

After the exchange of the probe 2, the first objective lens 3a is moved up and down by the motor 8 for adjusting the focusing point to be on the tip of the scanning probe 2. In the case of the present embodiment, in order that the surface of the sample 1, the tip of the scanning probe 2 and the focusing positions on the object lens 3a may be decided at arbitrary points on the optical axis, an infunite imaging system is adopted for the imagery system of the optical microscope 3 including the objective lenses.

After the focusing alignment, the observation area on the sample surface is properly moved by the x-y stage 11 for rough movement for confirming the existence of contamination or a damage on the sample surface, and then the positioning of the probe 2 is performed.

In FIG. 2, the illumination light from the light source 7 is converged by the condenser lens 6 and reflected at e halfmirror 5 to illuminate the surface of the sample 1 and the tip of the probe 2 via the first objective lens 3a. The reflected diffraction light from the sample 1 and the probe 2 is again passed through the first objective lens 3a, and the parallel rays from the lens 3a is transmittted through the halfmirror 5 to form an image on an imaging surface of the camera 4a with the second objective lens 3b. The optical image thus obtained can be observed on a TV monitor 18 having a CCU (camera control unit) 17, and the positioning of the sample 1 can be performed in operating the x-y stage 11 for rough movement watching the monitor 18.

The optical microscope 3 shown in FIG. 2 can be made to be of a differential interference type by the insertion of a polarizer 20 and a quarter-wave plate 21 into the latter part of the condenser lens 6, a Nomalsky prism 22 between the first objective lens 3a and the halfmirror 5, and an analyzer 23 between the halfmirror 5 and the second objective lens 3b, thereby an optical image in which minute uneven structure is emphasized can be obtained.

In the case of a scanning tunnel microscope, when the surface of a sample 1 is scanned with the prove 2, the tip of the scanning probe 2 approaches the surface of the sample 1 as close as 10 to 20 angstrom, so that it is necessary to find out a flat area to avoid the damage of the prove tip in scanning. In this case, it is possible to easily select a scanning area by observing the unevenness on the surface of the sample 1 at a vertical resolution of the order of 10 angstrom by the differential interference method in addition to the observation in a bright field. During the period of an observation by the optical microscope, the tip of the scanning probe is positioned far enough from the surface of the sample 1 being inside the focal depth of the objective lens 3a, therefore, there is no fear that the probe tip is damaged by the movement of the x-y stage 11 for the rough movement.

In the observation of the optical images of the surface of the sample 1 and the probe 2, as described in the above, it is necessary to move the objective lens 3a, the x-y stage 11 and the z stage 10 for rough movement, however, the apparatus has an excellent vibration-proof construction in which the optical microscope 3 is supported with a soundproofing and electromagnetic shielding cover 14 separated from the scanning tunnel microscope, and also the cover 14, and the stages 11 and 10 for rough movement are placed on a vibration-proof table 12 having a high resonant frequency, so that the vibrations of heavy movable parts are not easily transmitted to the scanning tunnel microscope.

Next, after the positioning of the probe 2 with the observation of the optical microscope 3, a bias voltage is applied to the sample holder 9 by the transmitter/receiver circuit 13, and the surface of the sample 1 is made to approach the tip of the probe 2 by the z stage 10. The approaching motion in z direction is stopped in a step when a tunnel current is started to flow between the probe 2 and the sample 1, to be able to perform positioning adjustment, and an optimum tunnel current is decided in the circuit 13.

Then, the raster scanning in x and y directions is performed in moving the scanning probe 2 in vertical direction to keep the tunnel current at a constant value which is previously set. The operation of the probe 2 is performed in applying voltages selectively to the electrodes $2X_1$, $2X_2$, $2Y_1$ or $2Y_2$ which are explained in FIG. 3 in performing a feedback control in detecting the tunnel current by the circuit 13, thus a three dimensional image of the surface of the sample 1 can be obtained.

Figure 8:
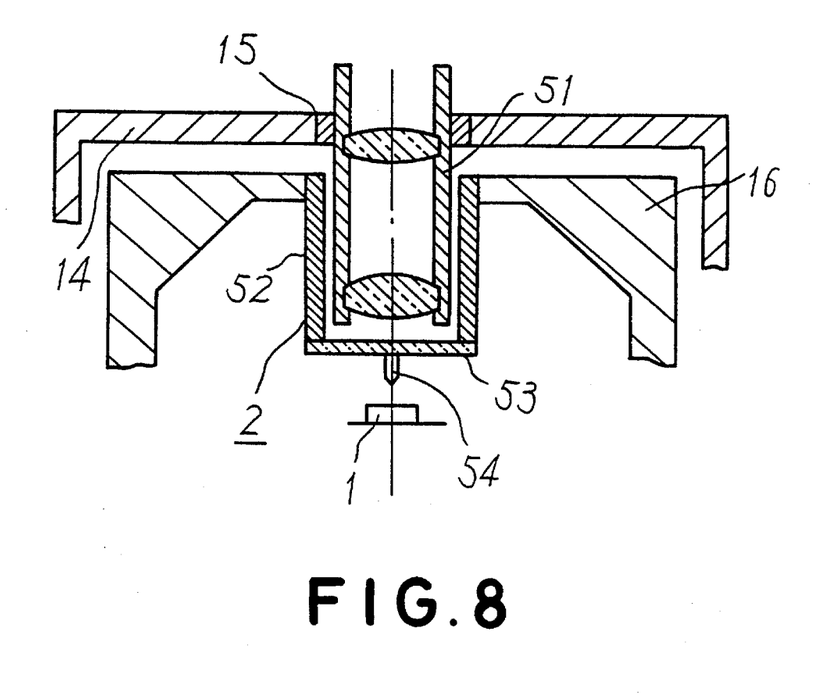
FIG. 8 is a typical sectional view showing another supporting construction of a scanning probe type microscope apparatus according to the present invention.

FIG. 8 is a typical sectional view showing another supporting mechanism according to the present invention, which shows the case where the probe 2 is disposed in the outer peripheral part of the optical microscope. In the figure, the constituent parts having the same functions as those shown in FIG. 1 are denoted by the same numerals and the explanation of these parts is omitted.

A barrel 51 supporting the object lens 3a which is a part of the optical microscope is inserted in an opening provided in the upper surface of the cover 14, and thus the barrel 51 is supported by the cover 14 via the cushion member 15. The probe 2 is composed of a cylindrical tube scanner 52, a probe supporting mechanism 53 provided on the end surface on the sample side of the tube scanner 52, and the probe tip 54 supported by the probe supporting mechanism 53, and is supported by the column 16. The tube scanner 52 is disposed so as to surround the outer periphery of the barrel 51, and the probe supporting mechanism 53 is positioned between the objective lens 3a and the sample 1. The probe supporting mechanism 53 is composed of a glass plate or a member having a ribbed structure for transmitting the light beam from the objective lens 3a.

The cover 14 and the column 16 are respectively installed on the vibration-proof table 12 to prevent the probe 2 from the influence of vibration from the an optical microscope.

In the example shown in FIG. 8, an optical microscopic image of the probe tip 54 of the probe 2 and that of the surface of the sample 1 can be simultaneously observed without providing a hole on the objective lens.

As described in the above, in the microscope apparatus according to the present embodiment, the optical microscope is individually supported by the cover 14 and the probe 2 is individually supported by the column 16 having a double-end-supported construction. Moreover, the cover 14 and the column 16 are installed on the vibrationproof table 12, so that the influence of vibration can be avoided and the amplitude of the vibration of the probe 2 can be suppressed at a very small value, which makes it possible to observe the surface of the sample 1 at the resolution of an atomic level.

Figure 4:
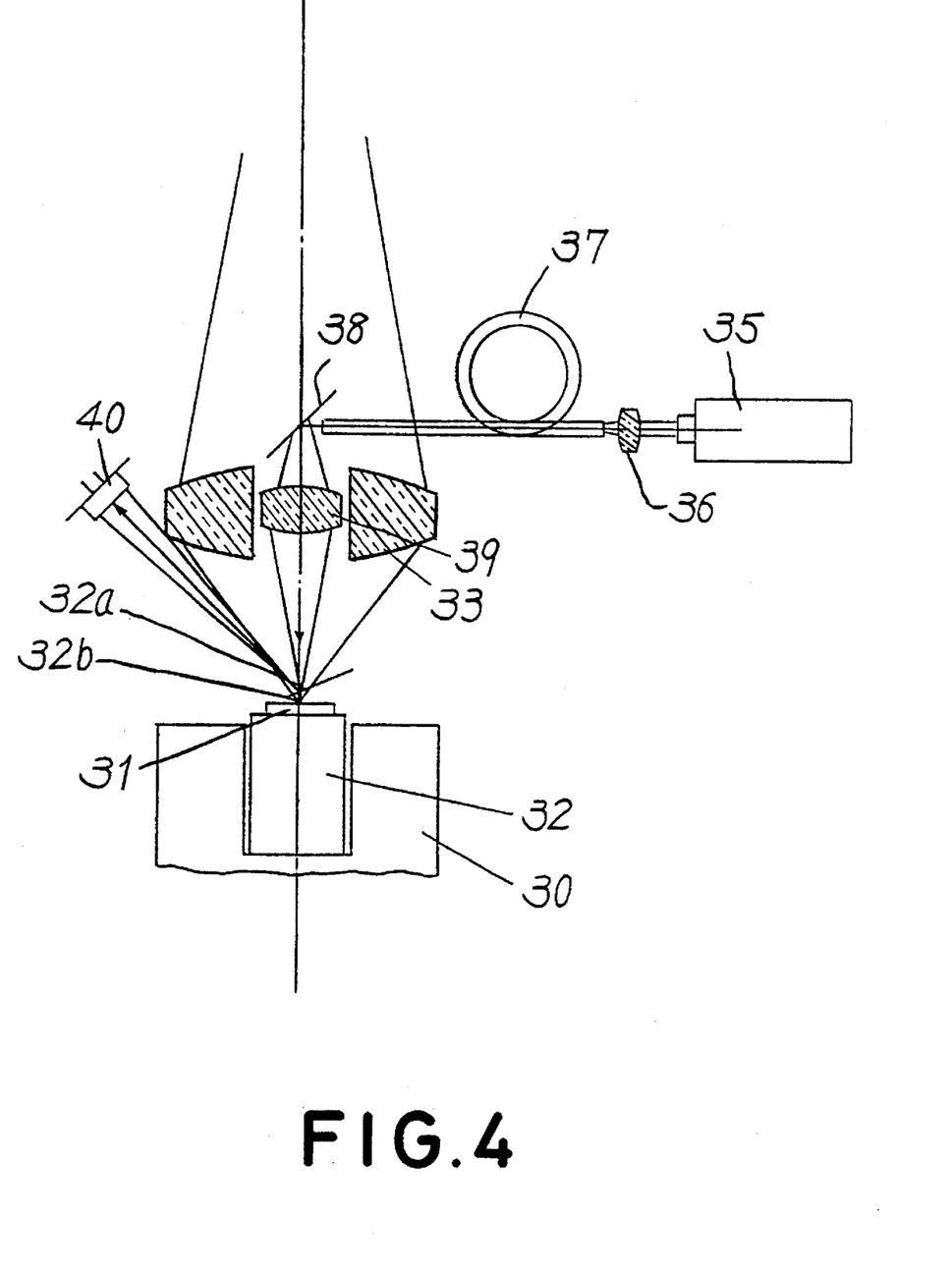
FIG. 4 is a constitutional representation of the principal part of a scanning probe type microscope apparatus according to another embodiment of the present invention.

FIG. 4 is a constitutional representation of a principal part of a scanning probe type microscope apparatus according to another embodiment. In this embodiment, an example is shown in which an atomic force microscope (AFM) and an optical microscope are combined. In the figure, a sample 31 is placed on a tube scanner (x-y scanning system) 32 which is provided with a rough movement stage 30, and an optical microscope (In the figure, only an object lens 33 is shown) is disposed above the sample 31. The optical microscope, which is not shown in the figure, is supported with a supporting member disposed on a vibration-proof table.

Inside the visual field of the optical microscope (in the example shown in FIG. 4, approximately on the optical axis) a film-shaped lever 32a (corresponding to the scanning probe 2 shown in FIG. 1) is supported with a supporting member (not shown in the figure) isolated from the optical microscope and is disposed in the vicinity of the sample 1. On the end of the lever 32a, a tip 32b is provided being protruded opposing to the surface of the sample 1, and when the tip 32b and the sample 1 are made to be close to each other, the lever 32a is bent by the action of a repulsive force according to Pauli's exclusion principle. In the case of an atomic force microscope, the microstructrure on the surface of the sample 1 is observed by detecting the bending quantity of the lever 32a with an optical means.

To be concrete, laser beam from a laser beam source (HeNe laser) 35 is incident into an optical fiber 37 through a collimator lens 36, and is led to the vicinity of the optical axis of the optical microscope, and further the laser beam is bent downward with a mirror 38 and converged by a collector lens 39 to irradiate the lever 32a. The laser beam reflected at the lever 32a are detected by a detector 40 which is disposed above the lever 32a at a certain angle. The intensity of the detected laser beams is varied by the change of bending quantity, so that the sample 31 is moved in vertical direction to maintain the detected intensity constant, and the surface of the sample 31 is x-y scanned with the tip 32b to observe the atomic level microstructure of the surface of the sample 31.

In the present embodiment, in order to irradiate the lever 32a inside the visual field of the optical microscope with the laser beam, the apparatus has a construction in which a hole is provided in the central part of the objective lens of the optical microscope to dispose the collector lens 39 of the atomic force microscope inside the hole, and the optical microscope and the atomic force microscope are completely isolated from each other. The optical microscope and the atomic force microscope are supported with separate members installed on a vibration-proof table, so that the vibration generated from the optical microscope does not influence onto the scanning operation of the atomic force microscope, and the resolution of a high degree can be secured.

In the descriptions aforementioned, the examples in which a combination of the scanning tunnel microscope and the optical microscope, and a combination of the atomic force microscope and the optical microscope are explained. The present invention, however, is not limited to these combinations, and the combination, for example, can be of an optical microscope and a scanning magnetic microscope or of an optical microscope and a near field microscope.

In the examples shown in FIG. 1 and in FIG. 4, the scanning probe is disposed on the optical axis of the optical microscope. In the present invention, however, the tip of a probe can be in any position inside the visual field of the optical microscope, and the probe can be disposed in a position apart from the optical axis inside the visual field for increasing the illuminating light quantity. From the point of view of vibration proofing, it is desirable to adopt a probe of a tube type, however a probe of the other type can also be adopted.

In the present invention, there is no limitation on the kind of optical microscopes and it is needless to say that an optical microscope of the other type than a differential interference type can be adopted.

Further, in the above examples, the supporting members for a probe and an optical microscope are installed on a vibrationproof table, it is not always necessary to use a vibration-proof table, and it can be an ordinary base table. In the above examples, a probe is supported with a double-end-supported construction, but in some case, a cantilever can be used.

What is claimed is:

1. A scanning probe type microscope apparatus having a probe for scanning a sample surface and an optical microscope mounted on a table in common with said scanning probe type microscope for simultaneously observing a terminal end of said probe and said surface through the visual field of said optical microscope comprising:

a first supporting member for individually supporting said optical microscope and a second supporting member for individually supporting said probe inside the visual field of said optical microscope and independent of said first supporting member with said optical microscope, said first supporting member and said second supporting member being commonly mounted on said table, and wherein said second supporting member has a double-end-support beam construction comprising a beam portion and first and second mounting column portions for fixedly supporting said beam portion to said table at opposite ends of said beam portion respectively, said probe being positioned substantially intermediate of said bean portion from said opposite ends.

2. A scanning probe type microscope apparatus according to claim 1 wherein said optical microscope comprises an objective lens having a through hole, and wherein said probe is disposed in said through hole.

3. A scanning probe type microscope apparatus according to claim 1 further comprising an electric system for electrically operating said scanning probe type microscope wherein said probe and said electric system is covered with a soundproof/electromagnetic shielding cover.

4. A scanning probe type microscope apparatus according to claim 3 wherein said optical microscope is supported by said soundproof/electromagnetic shielding cover.

5. A scanning probe type microscope apparatus according to claim 1 wherein said first supporting member and said second supporting member are installed on a vibration-proof table.

6. A scanning probe type microscope apparatus according to claim 1 wherein said optical microscope is of a differential interference type microscope.

7. A scanning probe type microscope apparatus according to claim 1 further comprising a television monitor for displaying an optical image obtained by said optical microscope.

8. A scanning probe type microscope apparatus according to claim 1 wherein said probe is a tube type probe having a cylindrical scanner and a probe tip.

9. A scanning probe type microscope apparatus a according to claim 8 wherein said cylindrical scanner is disposed so as to surround the outer periphery of an objective lens of said optical microscope and wherein said probe is supported with a transparent supporting member provided at the end portion on a sample side of said cylindrical scanner.

10. A scanning probe type microscope apparatus according to claim 9 wherein said transparent supporting member is composed of a glass plate or a member for transmitting a light beam from said objective lens.

11. A scanning probe type microscope apparatus according to claim 1 wherein said probe is adapted to be used for a scanning tunnel microscope.

12. A scanning probe type microscope apparatus according to claim 1 wherein said probe is adapted to be used for an atomic force microscope and comprises a lever disposed inside the visual field of said optical microscope and a tip provided on said lever and protruding from it.

13. A scanning probe type microscope apparatus according to claim 1 further comprising a collector lens for detecting the bending quantity of said lever by irradiating said lever with light beams, said collector lens being disposed in a through hole provided on an objective lens of said optical microscope.

* * * * *